(12) United States Patent
Wu

(10) Patent No.: US 7,237,795 B2
(45) Date of Patent: Jul. 3, 2007

(54) FOLDING MECHANISM OF A GOLF CART

(75) Inventor: Fang-Li Wu, Tainan (TW)

(73) Assignee: Sports World Enterprise Co., Ltd., Tainan Hsien (TW)

( * ) Notice: Subject to any disclaimer, the term of this patent is extended or adjusted under 35 U.S.C. 154(b) by 0 days.

(21) Appl. No.: 11/230,660

(22) Filed: Sep. 21, 2005

(65) Prior Publication Data

US 2007/0063487 A1    Mar. 22, 2007

(51) Int. Cl.
*B62B 3/02* (2006.01)

(52) U.S. Cl. ................ 280/651; 280/DIG. 6

(58) Field of Classification Search .......... 280/38, 280/40, 42, 639, 642, 647, 650, 651, 652
See application file for complete search history.

(56) References Cited

U.S. PATENT DOCUMENTS

| | | | | |
|---|---|---|---|---|
| 2,714,012 | A * | 7/1955 | Berger | 280/40 |
| 4,216,974 | A * | 8/1980 | Kassai | 280/42 |
| 4,614,454 | A * | 9/1986 | Kassai | 403/62 |
| 6,102,431 | A * | 8/2000 | Sutherland et al. | 280/642 |
| 6,220,621 | B1 * | 4/2001 | Newton | 280/650 |
| 6,345,836 | B1 * | 2/2002 | Wu | 280/651 |
| 6,991,248 | B2 * | 1/2006 | Valdez et al. | 280/647 |
| 7,077,420 | B1 * | 7/2006 | Santoski | 280/642 |

* cited by examiner

*Primary Examiner*—Frank Vanaman
(74) *Attorney, Agent, or Firm*—Rosenberg, Klein & Lee

(57) ABSTRACT

A folding mechanism of a golf cart includes a fixed member secured to a middle rod part of a golf cart frame, first and second moving members joined to upper and lower rod parts of the frame respectively, and a spring-biased pivotal plate. The moving members each have a toothed portion, which has an engaging protrusion at one end. The toothed portion of the first moving member further has a stop portion. The moving members are pivoted to the fixed member, and engaged with each other such that angular displacement of one of the moving members will cause angular displacement of the other. The golf cart will be fixed in a stretched position when the engaging protrusions engage. The pivotal plate is normally in a first position, in which position the front end thereof will engage the toothed portion of the first moving member to prevent the golf cart from folding.

3 Claims, 5 Drawing Sheets

FOLDING MECHANISM OF A GOLF CART

BACKGROUND OF THE INVENTION

1. Field of the Invention

The present invention relates to a folding mechanism of a golf cart, more particularly one, which allows the golf cart to move to its correct folded position in single motion, and allows the golf cart to move to its correct stretched position in single motion.

2. Brief Description of the Prior Art

Golf is getting more and more popular with the heightening of the standard of living. Because many different golf clubs, which are relatively heavy in weight, have to be used in a golf game, the golfers usually put their golf clubs in golf bags, and carry the golf bags with golf carts. Many golf carts can be folded so as to occupy less space for easy transportation and storage. However, most conventional foldable golf carts have a disadvantage: the users can't be sure whether or not a golf cart has been moved to its correct position, stretched or folded, after the stretching or folding motion. The user has to exert force on the golf cart again to make sure the golf cart can't be stretched or folded any further after stretching or folding the cart initially. Therefore, the golf carts aren't convenient to use, and are prone to being damaged owing to the users' improper application of force.

SUMMARY OF THE INVENTION

It is a main object of the invention to provide an improvement on a folding mechanism of a golf cart to overcome the above-mentioned problem. The folding mechanism includes a fixed member securely joined to a middle rod part of a frame of the golf cart, first and second moving members joined to an upper rod part and a lower rod part of the frame respectively, and a spring-biased pivotal plate. The moving members each have a toothed portion; the toothed portion of the first moving member has an engaging protrusion at one end thereof, and a stop portion at the other end; the toothed edge portion of the second moving member has an engaging protrusion at one end thereof. The moving members are pivoted to the fixed member, and engaged with each other at the toothed portions such that angular displacement of one of the moving members will cause angular displacement of the other. The golf cart will be fixed in its stretched position with engagement between the engaging protrusions. The pivotal plate is normally in a first position, under which position the front end thereof engages the toothed portion of the first moving member. The first moving member will be stopped from turning with the stop portion thereof being pressed against the pivotal plate as soon as the golf cart is moved to a folded position.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
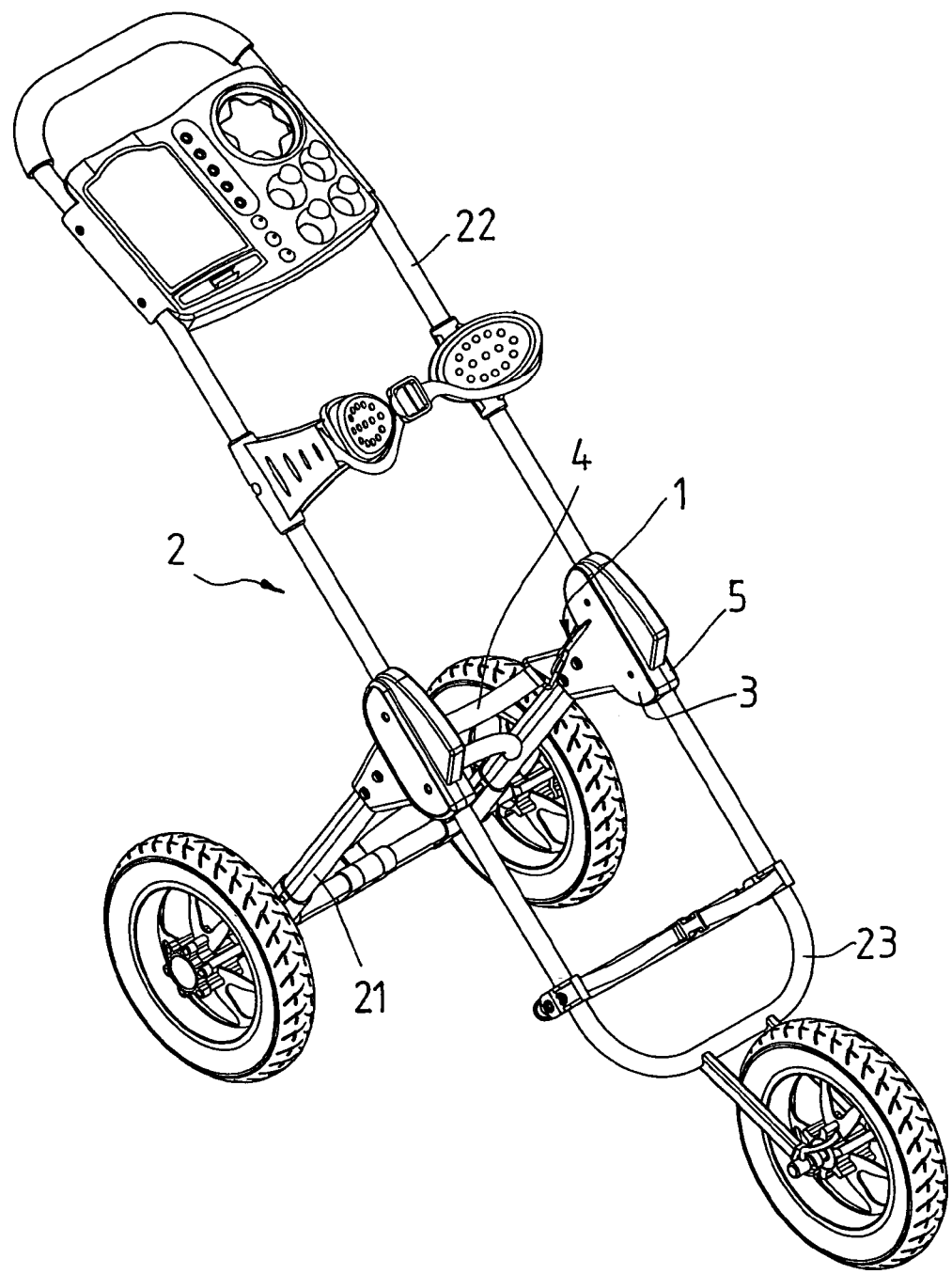
FIG. 1 is a perspective view of the golf cart according the present invention.
Figure 2:
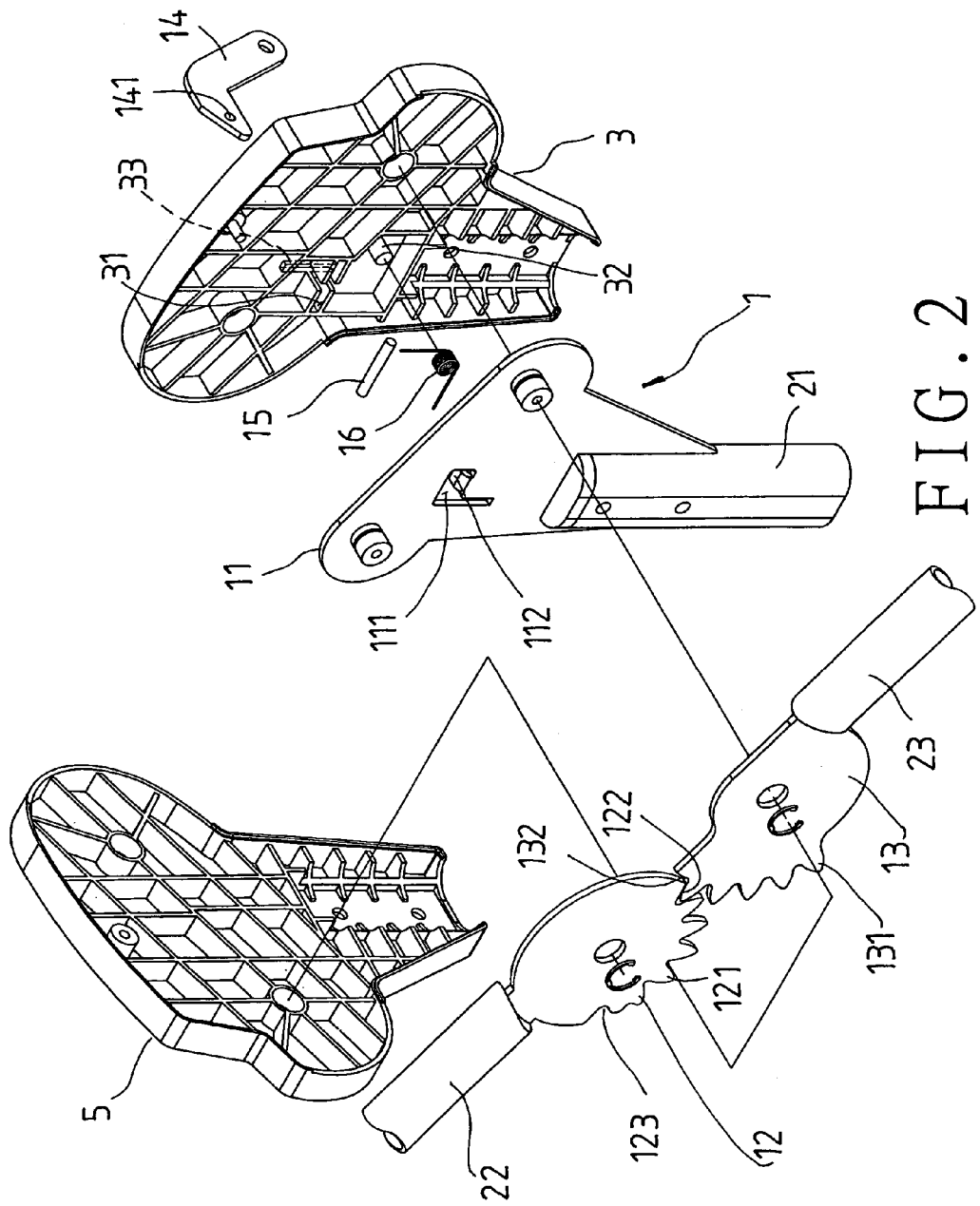
FIG. 2 is an exploded perspective view of the folding mechanism of a golf car in the present invention.
Figure 3:
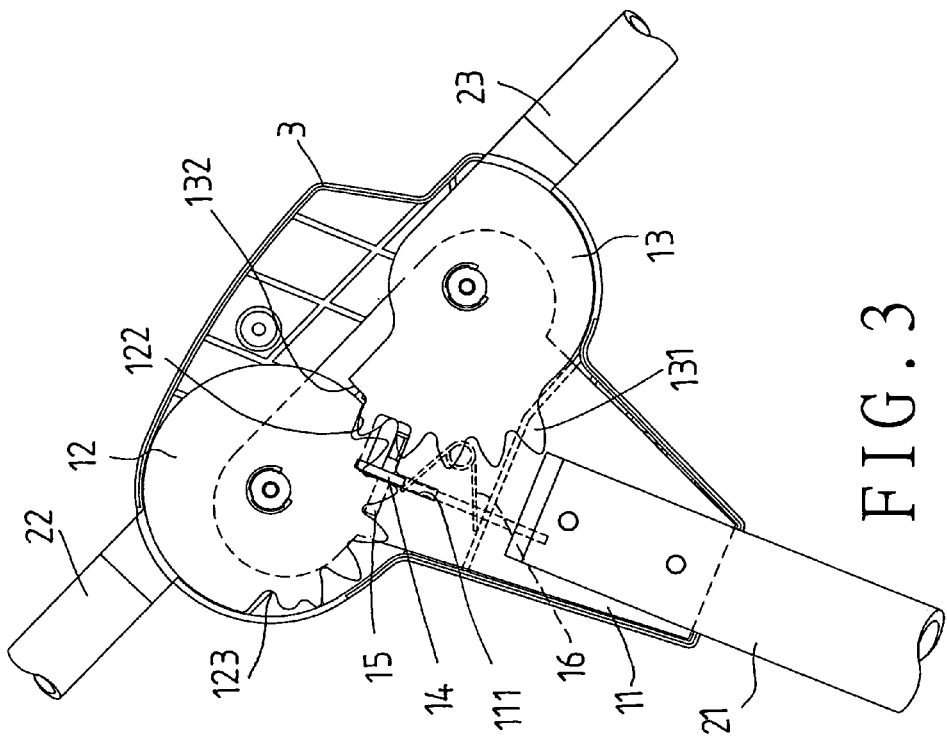
FIG. 3 is a front sectional view of the folding mechanism.

Referring to FIGS. 1 and 2, a golf cart is equipped with two folding mechanisms 1, which are positioned on left and right sides of a frame 2 of the golf cart respectively. The frame 2 includes two middle rod parts 21, two upper rod parts 22, and two lower rod parts 23.

Each of the folding mechanisms 1 includes:

a shell consisting of shell halves 3 and 5 securely joined together;

the shell half 3 having a holding compartment 31 on an inward side, a pivotal projection 32 below the holding compartment 31, and a slot 33 adjacent to and communicating with the holding compartment 31;

a fixed member 11 securely joined to a corresponding one of the middle rod parts 21 of the frame 2, and held in the shell; the fixed member 11 having an elongate gap 111, and a pressed plate part 112 next to the elongate gap 111;

two moving members 12 and 13 securely joined to one of the upper rod parts 22, and one of the lower rod parts 23 of the frame 2 respectively; the moving member 12 being formed with a toothed portion 121; the toothed edge portion 121 having an engaging protrusion 122 at one end thereof, and a stop portion 123 at the other end thereof; the moving member 13 being formed with a toothed portion 131; the toothed edge portion 131 having an engaging protrusion 132 at one end thereof; the moving members 12 and 13 are held in the shell, and pivoted to the fixed member 11, and engaged with each other at the toothed portions 121 and 131 such that angular displacement of one of the moving members 12 and 13 will cause angular displacement of the other; the moving members 12 and 13 being going to engage each other at the engaging protrusions 122 and 132 thereof when the golf cart is in the stretched position;

a pivotal element 15 held in the holding compartment 31 of the shell half 3; the pressing plate part 112 of the fixed member 11 being pressed against the pivotal element 15 to hold the pivotal element 15 firmly in position;

a pivotal plate 14 passed through the slot 33 and the holding compartment 31 of the shell half 3 as well as the elongate gap 111 of the fixed member 11; the pivotal plate 14 having a through hole 141 on an intermediate portion thereof; the pivotal element 15 being passed through the through hole 141 of the pivotal plate 14 so that the pivotal plate 14 is pivoted to the pivotal element 15;

a torsion spring 16 positioned around the pivotal projection 32 of the shell with one end being pressed against the shell half 3 and the other end being pressed against a bottom of the front end portion of the pivotal plate 14 such that a front end portion of the pivotal plate 14 is normally biased to its highest position by the torsion spring 16 so as to engage the toothed edge portion 121 of the moving member 12; and a strap 4 connected to the other end of the pivotal plate 14, which is outside the shell.

Figure 4:
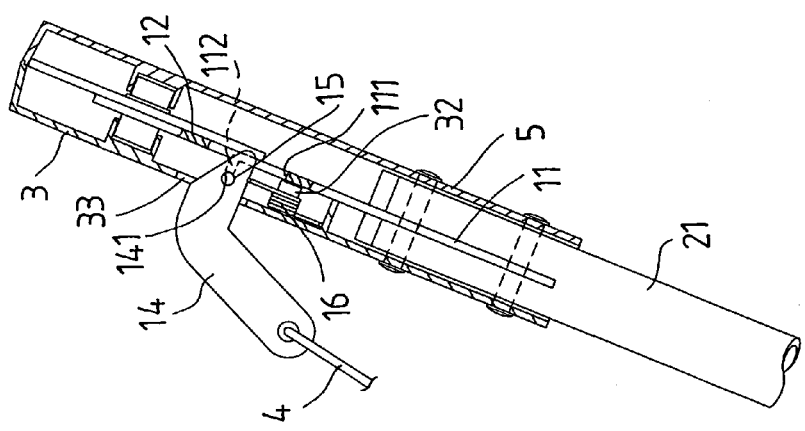
FIG. 4 is a lateral sectional view of the folding mechanism.
Figure 5:
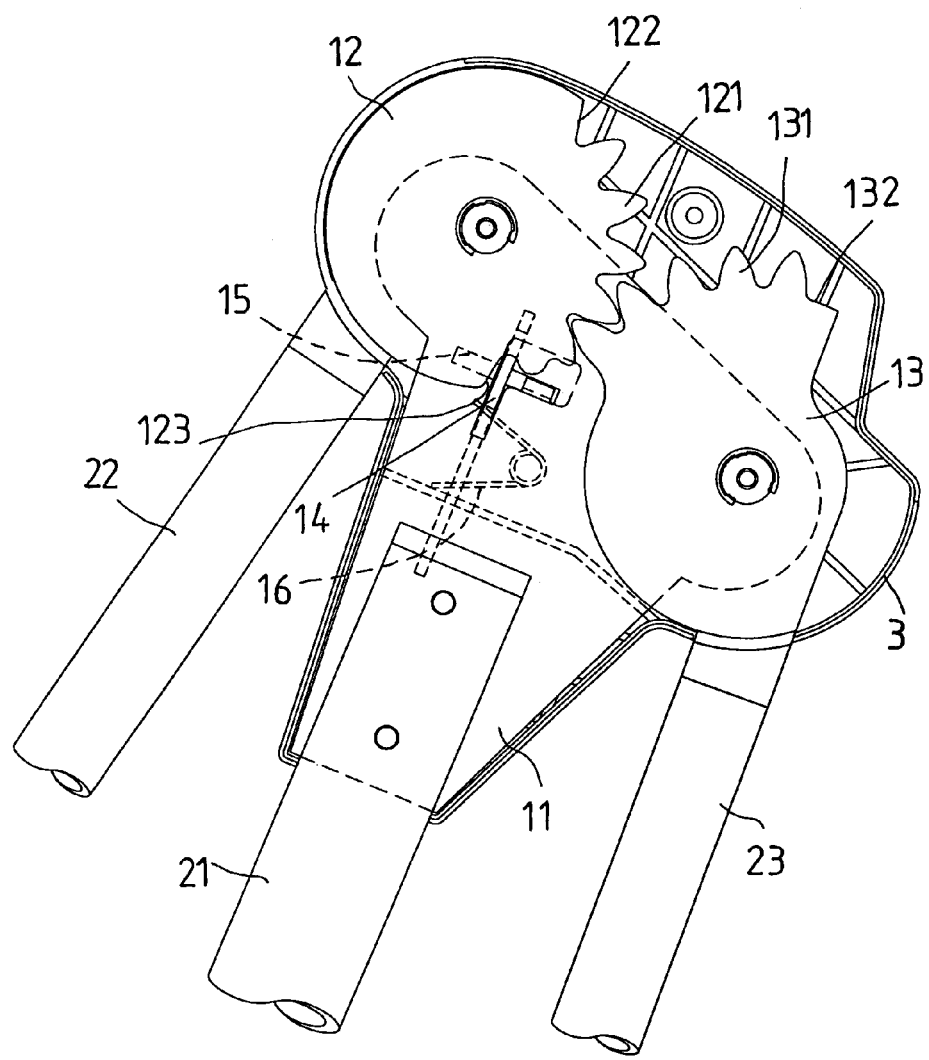
FIG. 5 is a view of the folding mechanism in use (1)

To fold the golf cart, referring to FIGS. 4 and 5, first the straps 4 are pulled upwards to pivot the pivotal plates 14 to such a position that the front end portions thereof are away from the toothed portions 121 of the moving members 12. Next, the upper rod parts 22 of the golf cart frame 2 are pivoted close to the middle rod parts 21 of the frame 2, thus causing the lower rod parts 23 of the frame 2 to pivot close to the middle rod parts 21; the upper rod parts 22 will be stopped from moving any further when it touches the front end portion of the pivotal plates 14 at the stop portions 123 thereof. Thus, the upper and the lower rod parts 22 and 23 are firmly held close to the middle rod parts 21 with the moving members 12 and 13, which are securely joined to the upper and the lower rod parts 22 and 23 respectively, engaging each other, and in turn the golf cart is in its folded position.

Figure 6:
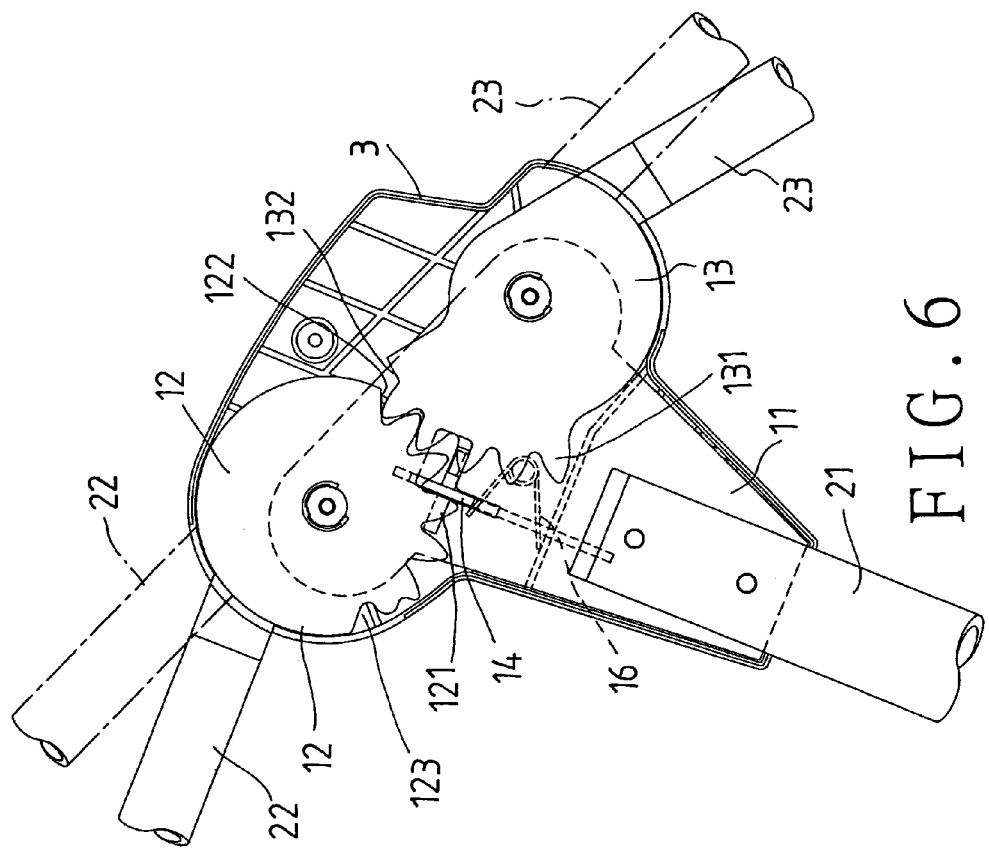
FIG. 6 is a view of the folding mechanism in use (2)
Figure 7:
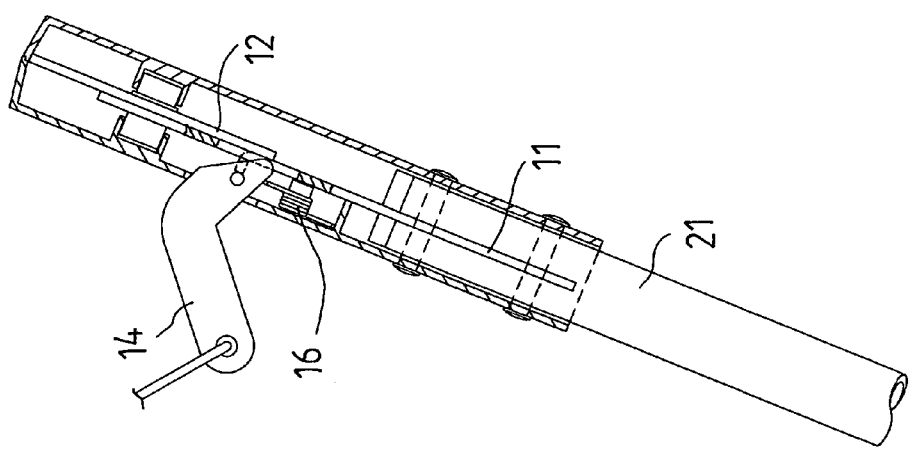
FIG. 7 is a view of the folding mechanism in use (3).

To stretch the golf cart, referring to FIGS. 6 and 7, the user only has to pivot the upper rod parts 22 of the frame 2 upwards such that the upper and the lower rod parts 22 and 23 are pivoted away from the middle rod parts 21 at the same time; when the upper rod parts 22 are pivoted upwards, the moving members 12 will depress the spring-biased pivotal plates 14 at the toothed portions 121 thereof therefore the front end portions of the pivotal plates 14 will move down and up repeatedly, incapable of stopping the angular displacement of the moving members 12 and the upper rod parts 22; the golf cart will be in its stretched position, and can't be stretched any further when the moving members 12 and 13 engage each other at the engaging protrusions 122 and 132 thereof.

From the above description, it can be easily seen that with the folding mechanisms of the present invention, the golf cart can be easily moved to its correct folded position in single motion, and it can be easily moved to its correct stretched position in single motion. Therefore, the folding mechanisms are convenient to use.

What is claimed is:

1. A folding mechanism of a golf cart,
the folding mechanism being positioned on a frame of a golf cart, which frame includes a first middle rod part, a first upper rod part, and a first lower rod part;
the folding mechanism including:
a shell consisting of first and second shell halves securely joined together;
a fixed member securely joined to the first middle rod part of the frame and held in the shell;
first and second moving members securely joined to the first upper and the first lower rod parts of the frame respectively; the first and the second moving members being each formed with a toothed portion; the toothed portion of the first moving member having an engaging protrusion at one end thereof, and a stop portion at another end thereof; the toothed portion of the second moving member having an engaging protrusion at one end thereof; the moving members being held in the shell, and pivoted to the fixed member, and engaged with each other at the toothed portions thereof such that angular displacement of one of the moving members will cause angular displacement of the other; the golf cart being in a stretched position when the moving members engage each other at the engaging protrusions thereof;

a pivotal plate passed through the first shell half; the pivotal plate being normally in a first position, in which position a front end portion thereof will engage the toothed edge portion of the first moving member to prevent the golf cart from folding; the pivotal plate being movable away from the first position when subjected to an external force; the pivotal plate being pivoted back to the first position when an external force is removed; the first moving member being stopped from turning by the stop portion thereof being pressed against the pivotal plate as soon as the golf cart is moved to a folded position; and a strap connected to one end of the pivotal plate that is outside the shell.

2. The folding mechanism of a golf cart as claimed in claim 1, wherein the fixed member has an elongate gap thereon, and a pivotal element is held in a holding compartment of the first shell half, and a torsion spring is positioned below the holding compartment in the shell; the pivotal element being passed through a through hole formed on an intermediate portion of the pivotal plate for the pivotal plate to pivot thereon; the pivotal plate being passed through the elongate gap of the fixed member; one end of the torsion spring being pressed against the shell and other end of the torsion spring being pressed against a bottom of a front end of the pivotal plate to bias the pivotal plate to its first position such that the front end portion of the pivotal plate normally engages the toothed portion of the first moving member.

3. The folding mechanism of a golf cart as claimed in claim 2, wherein the fixed member is formed with a pressing plate part, which is pressed against the pivotal element, to which the pivotal plate is pivoted, so as to hold the pivotal element firmly in position.

* * * * *